(12) United States Patent
Barker, Jr.

(10) Patent No.: US 9,340,405 B2
(45) Date of Patent: May 17, 2016

(54) FUEL TRANSACTION TRACKING SYSTEM

(71) Applicant: Progressive International Electronics, Inc., Knightdale, NC (US)

(72) Inventor: Arthur E Barker, Jr., New Hill, NC (US)

(73) Assignee: Progressive International Electronics Inc., Knightdale, NC (US)

( * ) Notice: Subject to any disclaimer, the term of this patent is extended or adjusted under 35 U.S.C. 154(b) by 0 days.

(21) Appl. No.: 14/829,759

(22) Filed: Aug. 19, 2015

(65) Prior Publication Data
US 2015/0360931 A1 Dec. 17, 2015

Related U.S. Application Data

(63) Continuation-in-part of application No. 14/080,927, filed on Nov. 15, 2013, which is a continuation-in-part of application No. 13/358,689, filed on Jan. 26, 2012, now abandoned.

(51) Int. Cl.
| | | |
|---|---|---|
| *G06F 17/00* | (2006.01) | |
| *B67D 7/04* | (2010.01) | |
| *G06Q 20/18* | (2012.01) | |
| *B67D 7/14* | (2010.01) | |

(52) U.S. Cl.
CPC .. *B67D 7/04* (2013.01); *B67D 7/14* (2013.01); *G06Q 20/18* (2013.01)

(58) Field of Classification Search
CPC ............ G06Q 10/06; G06Q 10/06311; G06Q 10/063112; G06Q 50/06; G06F 13/025
USPC .......... 705/1, 7.13, 7.14, 7.16, 7.18, 7.21, 39; 700/236, 244, 232; 370/467, 252; 222/52, 71; 343/895; 379/1.04, 27.01
See application file for complete search history.

(56) References Cited

U.S. PATENT DOCUMENTS

| | | | |
|---|---|---|---|
| 3,505,475 A | 4/1970 | Carbone et al. | |
| 4,107,777 A | 8/1978 | Pearson et al. | |
| 4,691,328 A | 9/1987 | Sterling, Jr. et al. | |
| 4,729,125 A | 3/1988 | Sterling, Jr. et al. | |
| 4,989,236 A | 1/1991 | Myllymaki | |
| 5,058,129 A | 10/1991 | Gupta et al. | |
| 5,826,241 A | 10/1998 | Stein et al. | |
| 6,116,505 A | 9/2000 | Withrow | |
| 6,184,846 B1 | 2/2001 | Myers et al. | |
| 6,446,049 B1 * | 9/2002 | Janning | A01K 15/023 141/94 |
| 6,529,800 B1 | 3/2003 | Johnson et al. | |
| 6,574,603 B1 | 6/2003 | Dickson et al. | |
| 6,697,705 B2 | 2/2004 | Johnson et al. | |
| 6,842,519 B1 | 1/2005 | Rumbaugh et al. | |
| 7,082,406 B1 | 7/2006 | Dickson | |
| 7,366,695 B1 | 4/2008 | Allen-Rouman et al. | |
| 8,055,526 B2 | 11/2011 | Blagg et al. | |

(Continued)

OTHER PUBLICATIONS

Salm et al., Power Plant Experience With Intelligent Remote Multiplexing, 1985, IEEE, p. 509-.*

(Continued)

*Primary Examiner* — McDieunel Marc

(74) *Attorney, Agent, or Firm* — James G. Passé; Passé Intellectual Property, LLC

(57) ABSTRACT

A fuel transaction tracking system such as used at gasoline pumps wherein a four wire data system is operated utilizing two wires and a multiplexing system to connect to a remote four wire station including computer.

9 Claims, 6 Drawing Sheets

(56) References Cited

U.S. PATENT DOCUMENTS

| | | |
|---|---|---|
| 8,249,907 B2 | 8/2012 | Blagg et al. |
| 2002/0046117 A1 | 4/2002 | Marion |
| 2003/0200108 A1 | 10/2003 | Malnoe |
| 2003/0230443 A1* | 12/2003 | Cramer ............... B60G 3/20 180/65.51 |
| 2005/0254527 A1 | 11/2005 | Jakel et al. |
| 2009/0129403 A1 | 5/2009 | Harrell et al. |
| 2011/0112936 A1 | 5/2011 | Hendrickson |
| 2011/0161593 A1 | 6/2011 | Yamazaki |
| 2011/0231318 A1 | 9/2011 | Finley et al. |
| 2012/0150933 A1 | 6/2012 | Boersma et al. |
| 2013/0146662 A1 | 6/2013 | Randolph |
| 2013/0198058 A1 | 8/2013 | Barker |
| 2015/0242969 A1* | 8/2015 | Pallas ............... G06Q 50/06 705/39 |

OTHER PUBLICATIONS

Current Loop, Wikipedia.com, http://en.wikipedia.org/wiki/Current_loop, Jul. 16, 2013.

Multiplexing, Wikipedia.com, http://en.wikipedia.org/wiki/Multiplexing, Oct. 28, 2011.

* cited by examiner

FUEL TRANSACTION TRACKING SYSTEM

This application is a continuation-in-part of U.S. non-provisional application Ser. No. 14/080,927 filed on Nov. 15, 2013, which is a continuation-in-part of U.S. non-provisional application Ser. No. 13/358,689 filed on Jan. 26, 2012, both are included herein in their entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to fuel transaction tracking. In particular, it relates to methods and devices for fuel transaction tracking with legacy wiring from a first location to a remote second location.

2. Description of Related Art

Fuel environment transaction tracking systems have been around for years and now the transaction system is integrated into the fuel dispenser. At service stations and mini mart type fueling stations, traditional gasoline pumps have now become point of sale devices, with elaborate electronics controlling the sale, with user interfaces, including use of large displays utilizing touch screen technology. As the purchasing system has become more elaborate, the devices include more than just the sale of gasoline, and can include food, car washes, and the like as added purchase options into the system.

In a typical arrangement, the user pumps their own gasoline at the pump and a gasoline attendant sits inside, or in a booth, to monitor the system and handle cash transactions. Typically, the computer, or other data controller, is similarly situated, with a connection made between the transaction messaging data system at the pump and the computer operating and tracking system at another location (such as inside the booth with the attendant). As an example of a system and the flow of information in such a system, one can refer to U.S. Pat. No. 6,116,505, incorporated herein by reference.

In the installation of these devices, the wiring between the fuel transaction data system and the computer is placed in the asphalt or cement of the gasoline station and, once placed there, it becomes extremely difficult to change or add to that wired line. This has introduced a problem in the marketplace. At this point, there is a fuel transaction data system manufacturer that sells a system that utilizes a two wire system, utilizing a current loop. The remaining systems available in the marketplace utilize a four wire legacy wiring system to accomplish the same connection, or require a non-current loop setup. In the event a gasoline station has only installed two wires underground in a current loop and wants to switch to another system, they are faced with either tearing up their driveway to lay new line, or being stuck with one manufacturer to purchase their system from, otherwise they are without the ability to switch to another system.

BRIEF SUMMARY OF THE INVENTION

The present invention relates to a system for providing connection to a fuel transaction tracking system having a four wire legacy tracked data system at a fueling station, with two wires connected to a computer at a remote location, which overcomes these problems and more.

Accordingly, in one embodiment of the invention there is claimed a fuel transaction tracking system, a first location having a fuel transaction data system with a four wire legacy configuration, a four wire remote station at a second location, and two underground communication wires positioned between the first and second location in a current loop comprising:
 a) an active multiplexing/demultiplexing unit, having active power and two data inputs and two data outputs actively connected to the four wires of the fuel transaction data system and a two wire output for connection to an end of the two underground communication wires;
 b) a passive multiplexing/demultiplexing unit, having a two wire input for connection to an opposite end of the two underground communication wires and a four wire data output for connection to the four wire remote station comprising a first and second bidirectional current loop connected to the four wire remote station;
 c) wherein the active and passive units are actively connected from the two wire output to the two wire input via the two communication wires; and
 d) wherein the system is capable of multiplexing/demultiplexing four wire data to and from the fuel transaction data system, and the four wire remote station via the two underground communication wires set up as a current loop.

DETAILED DESCRIPTION OF THE INVENTION

Figure 1:
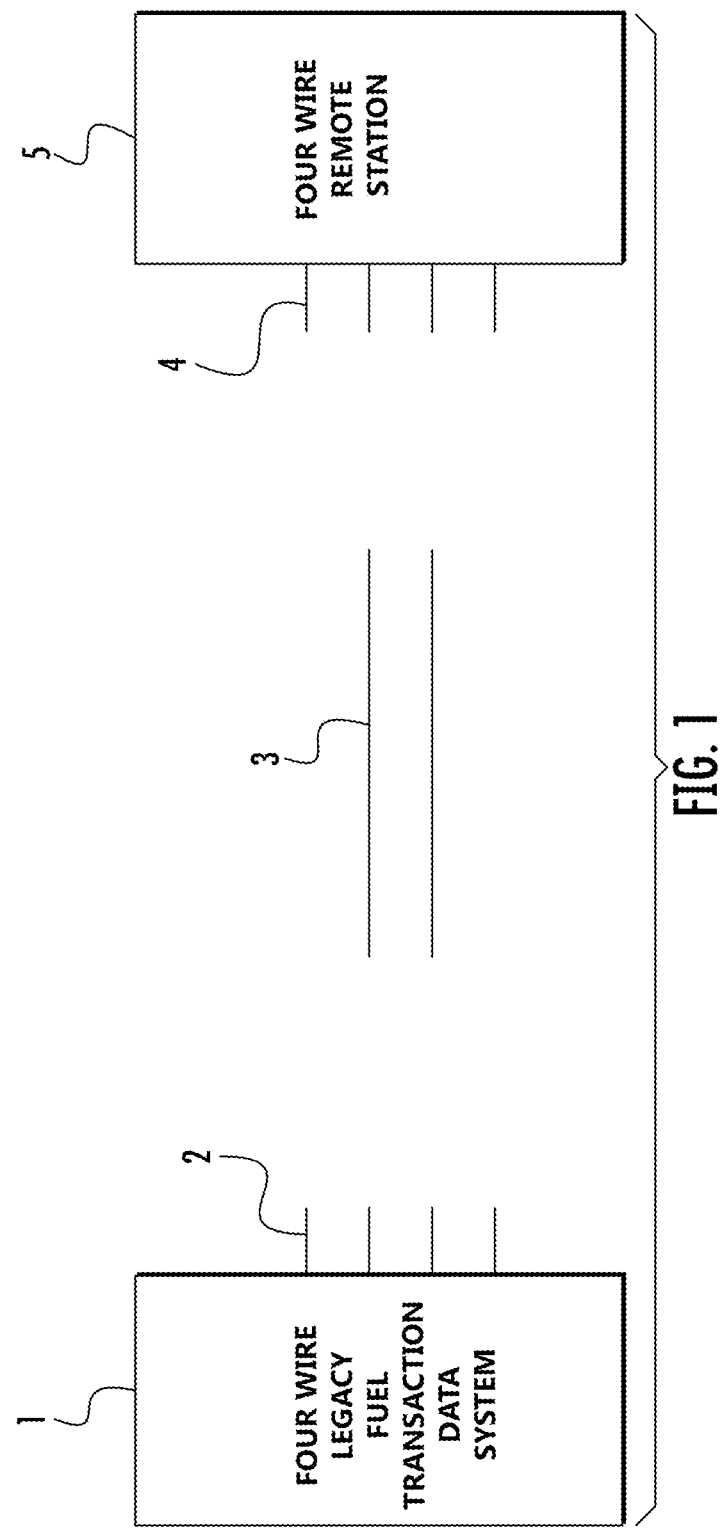
FIG. 1 is a view of a fuel transaction system prior to the present invention.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The term "about" means ±10 percent.

The term "essentially" means ±10 percent.

The terms "a" or "an", as used herein, are defined as one or as more than one.

The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the phrase "fuel transaction tracking" refers to the entire system of selecting, dispensing, and paying for gasoline, and record keeping at a gasoline dispensing location with a fuel transaction data system at one end of a station, and a computer at the other. The system includes, but is not limited to, a "fuel dispensing system" which consists of a fuel dispensing hose for dispensing the fuel to a customer from an underground tank or other fuel storage device. The dispenser may also include payment mechanisms, such as a cash acceptor or a credit card reader and/or any other device (for example "speed pass") for automated processing of the fuel payment. It usually consists of a receipt producing device for providing an accounting receipt to the customer. Other optional services can be provided, like the ability of paying for other services, such as car washes, food, or anything else sold at the location. Normally, the fuel transaction tracking system is a four wire system wherein four wires are run underground to a remote station. However, in this embodiment, the fuel transaction tracking system is a four wire legacy system, but the location has two underground wires set up as a current loop to use to connect to the remote station and provide bi-directional communication.

As used herein, there is a "four wire legacy remote station" which provides information about other purchases and connects to credit card processing, controls electronics and data processing, and the like, and is located at a distance from one or more fuel dispensing systems at a location. In the present invention, the remote station is also a four data wire legacy system designed to receive four wire data from one or more fuel transaction data systems associated with the fuel dispensing. Under normal circumstances, with only two underground data communication wires set up as a current loop available, the remote station and the four wire fuel transaction data system could not be utilized.

As used herein, the present invention comprises an "active multiplexing/demultiplexing unit" (M/D 1) which has an active power system for transmitting four wires of data over a two wire current loop, for example, utilizing electric power from the fuel transaction data system or other source where this unit is positioned or other localized powering system. The M/D 1 takes the four wire data and passes it out to the two wire underground system current loop. It is also capable of demultiplexing the signals received from the remote unit over the two wire underground system. The output of the M/D 1 is connected to one end of the underground data communication wires.

At the opposite end of the two underground wires is a "passive multiplexing/demultiplexing unit" (M/D 2) which has a two data wire input and a four data wire input/output set of wires communicatively connected to the four wire remote station. The M/D 2 is then capable of de-multiplexing the signal from M/D 1 and delivering it to the remote station and taking a signal from the remote station from its four data wires and delivering it multiplexed bay on the underground wires via the underground two wire system.

In the use of the system of the present invention, a customer purchasing fuel can enter information at the fuel transaction data system, which then arrives at the M/D 1. The M/D 1 then sends the data over the underground pair of wires to the M/D 2, which demultiplexes the signal and delivers it to the remote station. The reverse process occurs when the remote station delivers data to the fuel transaction data system.

Now referring to the drawings, FIG. 1 shows the basic fuel transaction tracking system setup without the improvement of the present invention. A four legacy wire fuel transaction data system 1 is shown where fuel is dispensed, with four legacy wires 2 of data system 1 are shown unconnected. A pair of underground wires 3 is shown not connected at either end, while four legacy wires 4 of remote station 5 are shown unconnected.

Figure 2:
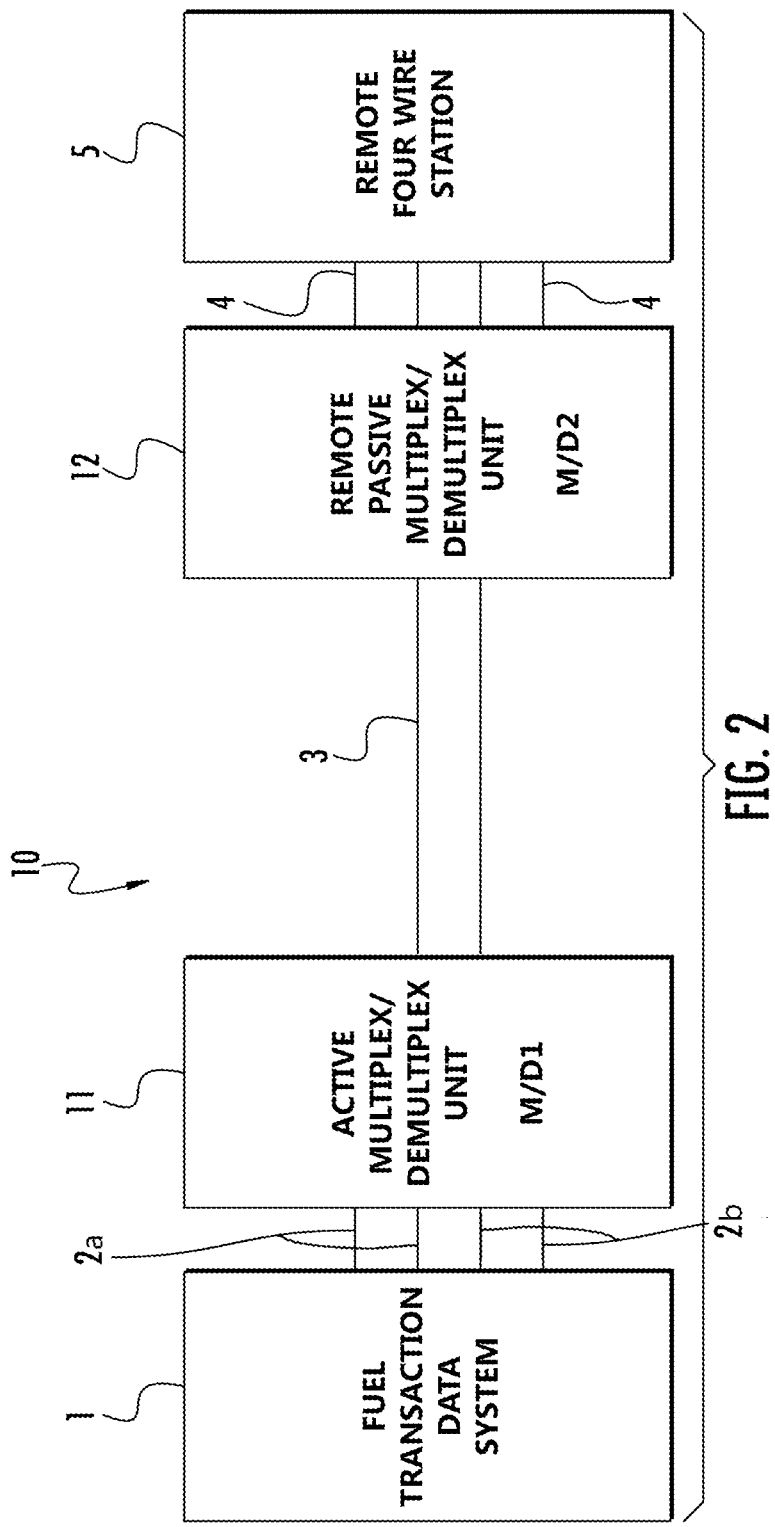
FIG. 2 is a diagram view of the present invention system.

In FIG. 2 the fuel transaction tracking system of the present invention is shown. Fuel transaction tracking system 10 is shown with local powered M/D1 11 shown. The M/D1 11 is connected to the four legacy data wires of the fuel transaction data system 1 and to the pair of underground wires 3 via input 2a and output 2b wires. A remote passive controller 12 (non-powered) is hooked up at the other end of the pair of underground wires 3 and has a connection via four wires to remote station 5 via the four input/output data wires 4.

Figure 3:
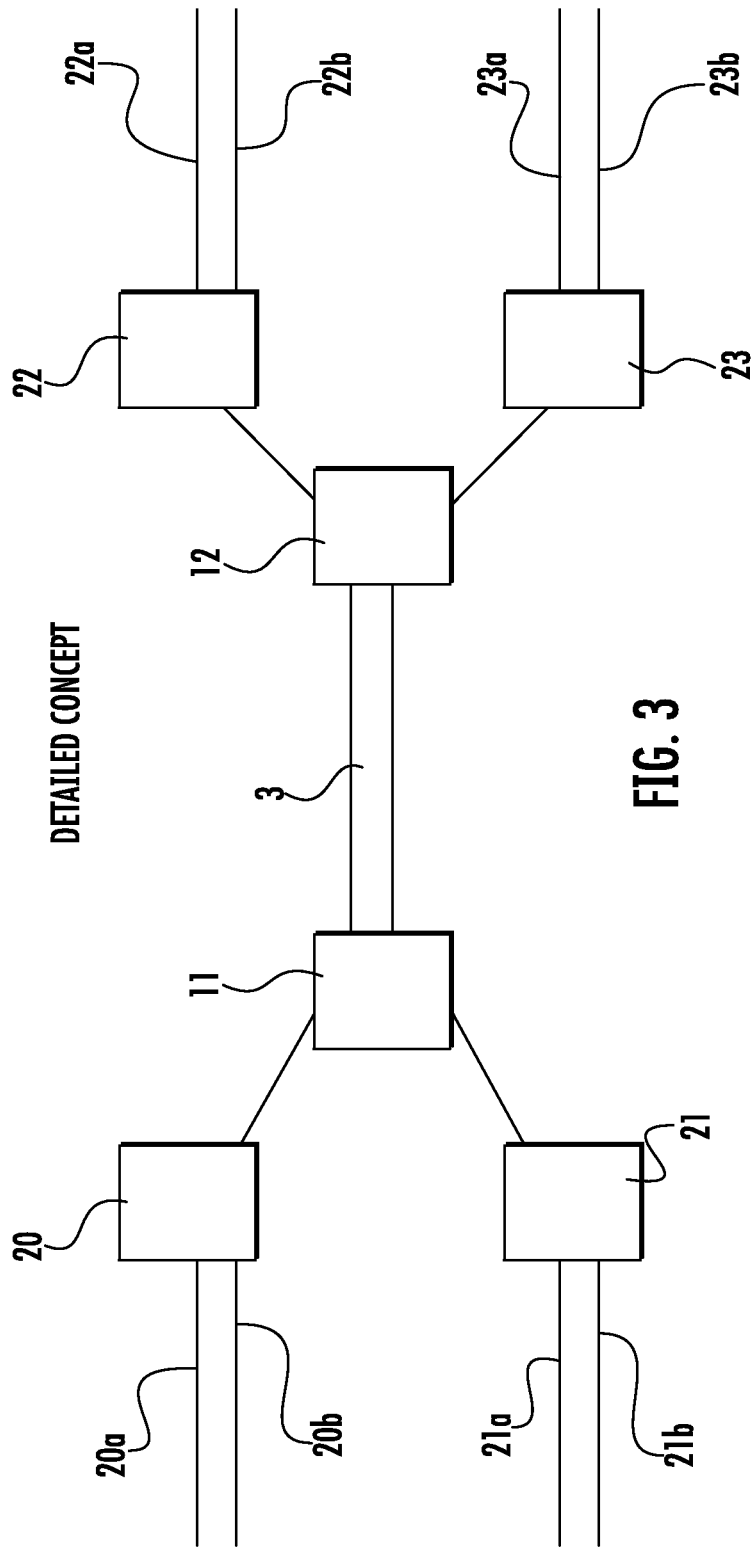
FIG. 3 is a view of a more detailed view of connection between the multiplexing/de-multiplexing units.

FIG. 3 has a more detailed example of the M/D1 connection and devices. Devices 20 and 21 represent the two input/output channels (four wires) of M/D1 11. The M/D1 11 has channel 20 consisting of input block wires 20a (output) and 20b (input) and channel 21 consisting of wires 21a (output) and wires 21b (input) and input. The M/D1 11 then alternatively transmits information data from the two channels 20 and 21 via the underground wire pair 3. Transmitting it to M/D2 12 which demultiplexes the signal and converts it to channel 22, which has wires for a bidirectional current loop on wires 22a and 22b. It creates second channel 23 with wires for a bidirectional current loop 23a and 23b for connection to the remote station.

Figure 4:
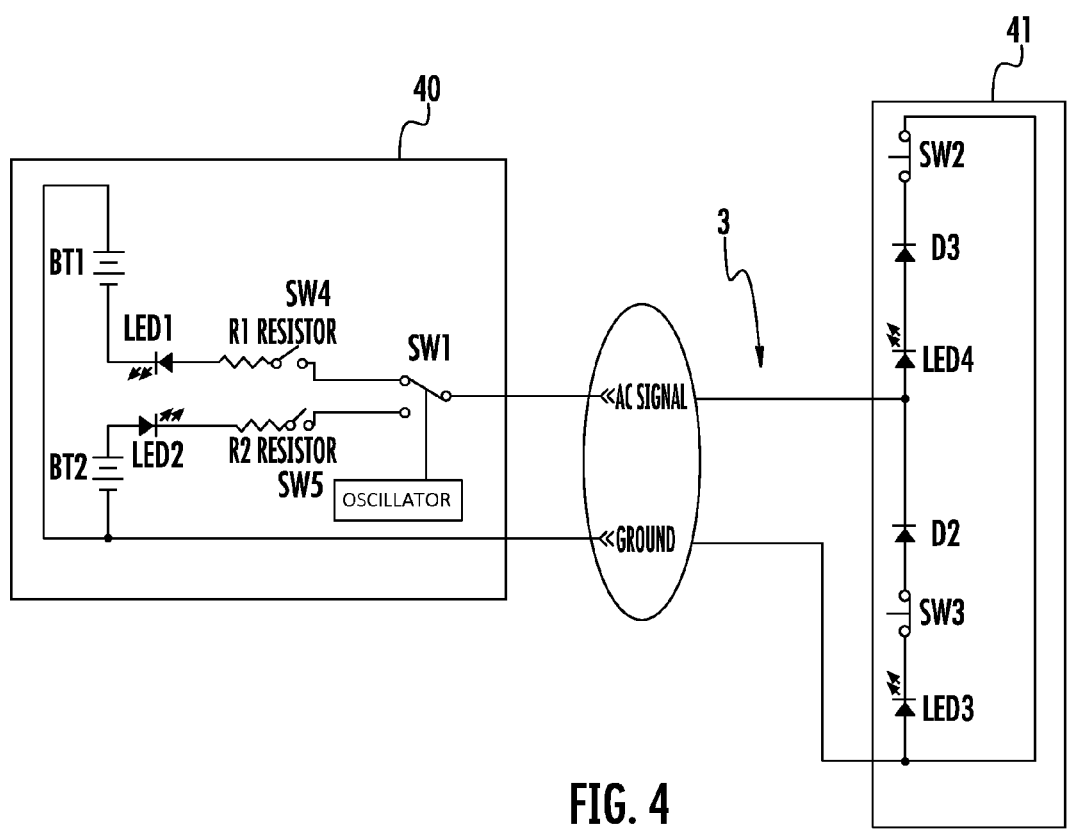
FIG. 4 is a simplified schematic of an embodiment of the invention between the multiplexing/demultiplexing units.

FIG. 4 is an example circuit diagram for the local M/D111 and remote multiplexer 12. Shown is the local circuit 40 and remote circuit 41 of the present invention. The local circuit 40 receives signals from the fuel dispensing system and handles as follows. The following abbreviations are used. BT=battery, LED=Light emitting diode; R=resistor; SW=switch; D=diode; Q=transistor. When SW1 is in the upper position, current flows from BT1 through the ground wire through LED3, SW3, D2, through the AC signal wire (of pair 3), through resistor R1 and LED1 back to the battery. Both LED1 and LED3 will be lit. Pressing SW3 or SW4 will open the circuit, causing LED1 and LED3 to both go out. The resister R1 is utilized to limit the LED current appropriately.

When SW1 is in the lower position, current flows from BT2 through LED2 and R2, switch SW5, and out the AC signal wire, through LED4, D3, SW2, through the ground back to BT1. Both the LED2 and LED4 will be lit. Pressing on SW2 or SW5 will open the circuit causing both LED2 and LED4 to go out. Once again, a resistor R2 limits the current to the LED.

Figure 5:
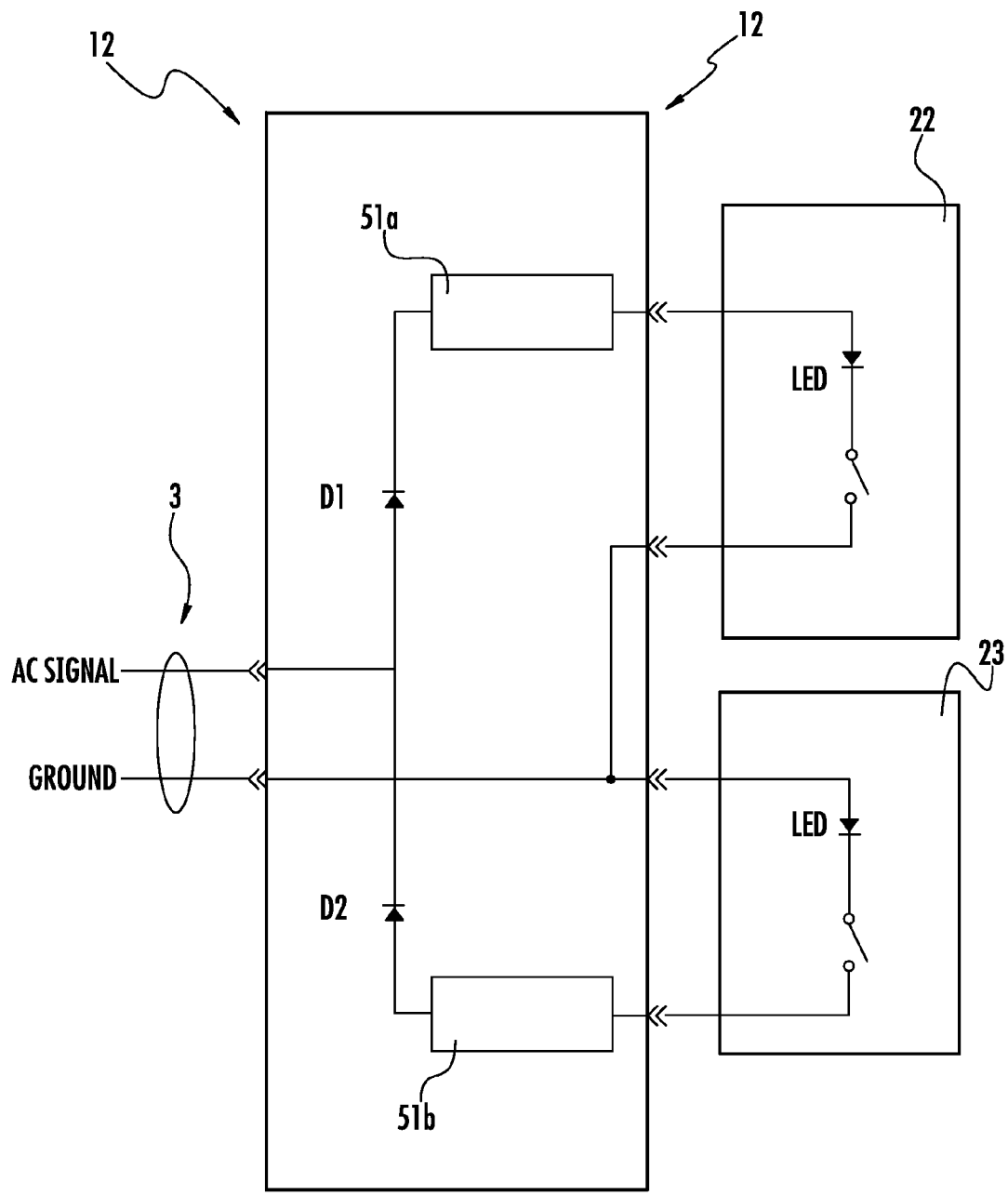
FIG. 5 is a simplified schematic of the remote station.

FIG. 5 depicts a simplified but more specific embodiment of the remote passive multiplexer. In the particular example shown, actual circuits are 45 milliamps. Diode D1 allows current flow through the top loop on the positive excursion of the AC signal. Diode D2 allows current to pass through the bottom loop on the negative excursion of the AC signal line. Passive filters 51a and 51b filter out the high speed carrier signal.

Figure 6:
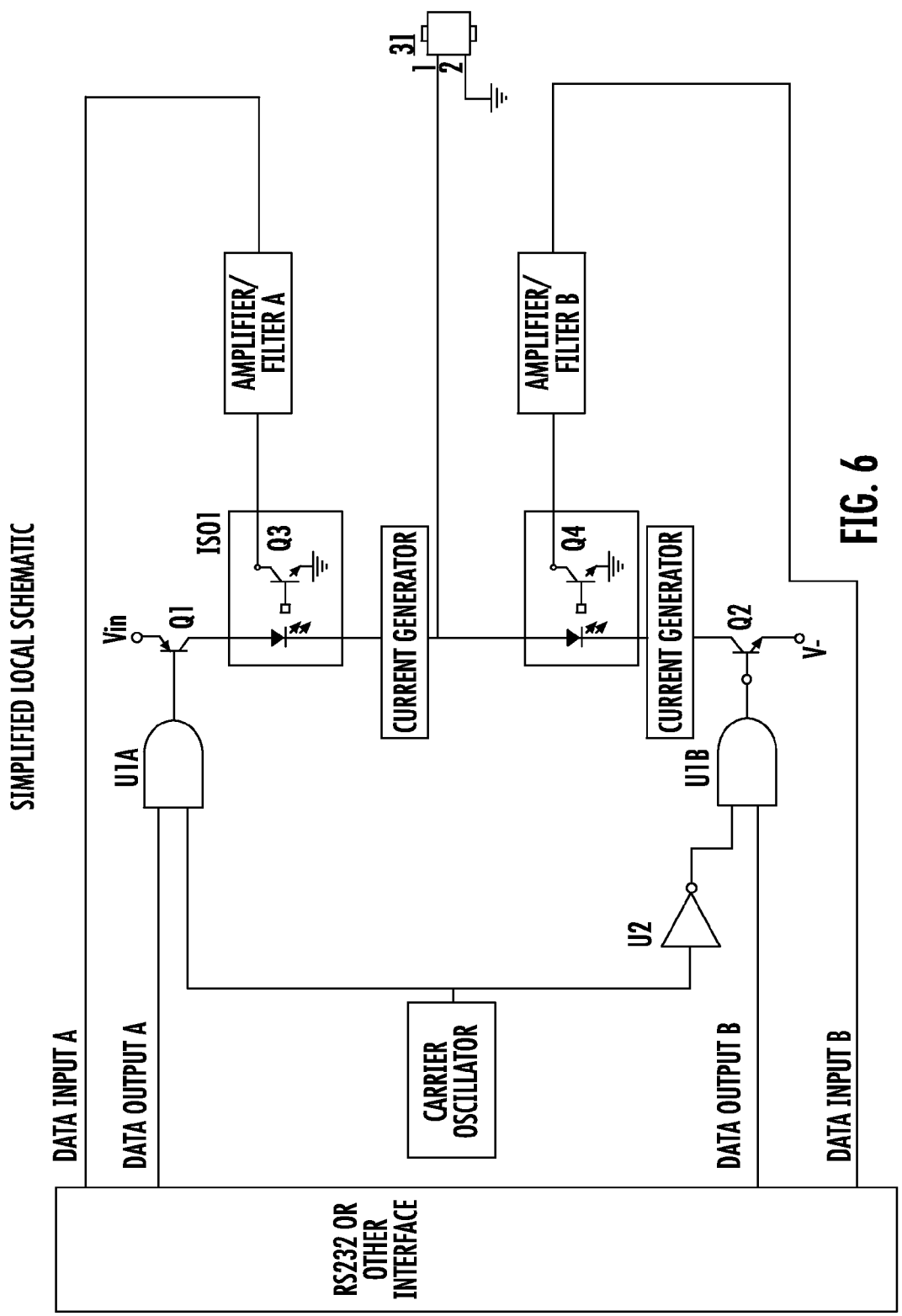
FIG. 6 is a local schematic of the active multiplexing/de-multiplexing units.

FIG. 6 shows a simplified schematic that is depicted of the local multiplex unit (M/D1). The local circuit consists of two asynchronous serial channels, using RS-232 or other interface to the pump controller, and circuitry to generate an AC signal, and pick up and filter the receive signal. Carrier oscillator generates a clock at higher speed than the data. This clock performs the flipping of the switch (SW1 on FIG. 4) back and forth at high speeds. The transmission from both the card and clock are synchronized to the carrier oscillator.

Since the top and bottom half of the circuits are essentially identical, only the top half will be described. When the clock is positive, the top half of the circuit is turned on, when the clock is negative, the bottom half of the circuit is turned on, generating the AC signal. The data output A is logically AND'd with the clock, using U1A and U1B generating either the original clock or nothing, shutting off the positive side of the circuit. Transistor Q1, takes the signal and amplifies it to a higher voltage. ISO1 is an optocoupler used to pick up the receive signal. This circuitry generates the positive side of the AC signal. The bottom half does the same thing, only generating a negative going signal. Depending on the state of the carrier oscillator, only either the top or the bottom half of the circuit is turned on.

The transistor of ISO1 Q3 picks up the signal, and is shaped using AMP/filter A to square up the signal. The only differences for the bottom half is the extra inverter U2, so both sides are not on at the same time, and transistor Q2 amplifies to a higher voltage.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A fuel transaction tracking system at a first location having a fuel transaction data system with a four wire legacy configuration, a four wire remote station at a second location, and two underground communication wires positioned between the first and second location in a current loop comprising:
    a) an active multiplexing/demultiplexing unit having active power and two data inputs and two data outputs actively connected to the four wires of the fuel transaction data system and a two wire output for connection to an end of the two underground communication wires;
    b) a passive multiplexing/demultiplexing unit having a two wire input for connection to an opposite end of the two underground communication wires and a four wire data output for connection to the four wire remote station comprising a first and second bidirectional current loop connected to the four wire remote station;
    c) wherein the active and passive units are actively connected from the two wire output to the two wire input via the two communication wires; and
    d) wherein the system is capable of multiplexing/demultiplexing four wire data to and from the fuel transaction data system and the four wire remote station via the two underground communication wires set up as a current loop.

2. The fuel transaction tracking system according to claim 1 wherein a customer at the fuel transaction data system enters information thereon which is transmitted to the remote station.

3. The transaction system according to claim 1 wherein the fuel transaction tracking system comprises a customer input device.

4. The transaction system according to claim 1 which includes one or more automated payment mechanisms.

5. The transaction system according to claim 4 wherein the fuel dispensing system includes a credit card reader.

6. The transaction system according to claim 1 wherein there is a central controller communicatively linked to the remote terminal and the fuel dispensing system.

7. The fuel transaction tracking system according to claim 1 wherein there is a fuel dispensing system connected to the fuel transaction data system.

8. The transaction system according to claim 1 wherein the fuel system further comprises purchases other than fuel.

9. The transaction system according to claim 1 wherein the remote location includes a computer.

* * * * *